US012067700B2

United States Patent
Zhu et al.

(10) Patent No.: US 12,067,700 B2
(45) Date of Patent: Aug. 20, 2024

(54) METHOD FOR AUTOMATIC CLASSIFICATION OF PATHOLOGICAL IMAGES BASED ON STAINING INTENSITY MATRIX

(71) Applicant: ZHEJIANG LAB, Zhejiang (CN)

(72) Inventors: Wentao Zhu, Hangzhou (CN); Mengfan Xue, Hangzhou (CN); Shaojie Li, Hangzhou (CN); Defu Yang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 365 days.

(21) Appl. No.: 17/701,692

(22) Filed: Mar. 23, 2022

(65) Prior Publication Data

US 2023/0080337 A1    Mar. 16, 2023

(30) Foreign Application Priority Data

Sep. 13, 2021  (CN) .......................... 202111068267.0

(51) Int. Cl.
*G06T 7/00*    (2017.01)
*G06T 7/11*    (2017.01)
(Continued)

(52) U.S. Cl.
CPC .............. *G06T 7/0002* (2013.01); *G06T 7/11* (2017.01); *G06T 7/194* (2017.01); *G06T 7/90* (2017.01); *G06T 2207/30024* (2013.01)

(58) Field of Classification Search
CPC ...... G06V 40/174; G06V 10/25; G06V 40/18; G06T 7/20; G10L 25/63
See application file for complete search history.

(56) References Cited

U.S. PATENT DOCUMENTS

| 2010/0074506 A1* | 3/2010 | Yamada | G06V 20/698 |
| | | | 382/133 |
| 2016/0042511 A1* | 2/2016 | Chukka | G06V 20/695 |
| | | | 382/133 |

(Continued)

FOREIGN PATENT DOCUMENTS

| CN | 105550651 A | 5/2016 |
| CN | 110110634 A | 8/2019 |

OTHER PUBLICATIONS

CN First Office Action(202111068267.0); Date of Mailing: Nov. 2, 2021.

*Primary Examiner* — Umair Ahsan
(74) *Attorney, Agent, or Firm* — W&G Law Group

(57) ABSTRACT

Disclosed is a method for automatic classification of pathological images based on a staining intensity matrix. This method directly extracts the staining intensity matrix irrelevant to a stain ratio, a staining platform, a scanning platform and some human factors in the pathological image as the feature information of classification, without restoring normalized stained images, while retaining all impurity-free information related to diagnosis. It avoids the phenomenon that the diagnostic effect of the existing computer-aided diagnosis method of pathological images based on the traditional color normalization method changes with the changes of the selected standard pathological sections. Moreover, it avoids the error introduced by the need to restore the stained image, and has a higher diagnostic accuracy and a more stable diagnostic effect. At the same time, the method can realize the diagnosis of pathological images in a shorter time, which is easy to realize and more practical.

5 Claims, 3 Drawing Sheets

(51) Int. Cl.
*G06T 7/194* (2017.01)
*G06T 7/90* (2017.01)

(56) References Cited

U.S. PATENT DOCUMENTS

2018/0053299 A1* 2/2018 Gholap ................ G06T 7/0014
2020/0349707 A1 11/2020 Hosseini et al.

* cited by examiner

METHOD FOR AUTOMATIC CLASSIFICATION OF PATHOLOGICAL IMAGES BASED ON STAINING INTENSITY MATRIX

CROSS-REFERENCE TO RELATED APPLICATIONS

The present application claims priority to Chinese Patent Application No. 202111068267.0, filed on Sep. 13, 2021, the content of which is incorporated herein by reference in its entirety.

TECHNICAL FIELD

The present disclosure relates to the technical field of medical image processing, and in particular to an automatic classification method of pathological images based on a staining intensity matrix.

BACKGROUND

Histopathological examination is a pathomorphological method to analyze and diagnose diseases by examining pathological changes in tissues, and it is the most accurate method to diagnose cancer at present. The Whole Slide Image (WSI) is a large-scale digital image with a high magnification that can be displayed, transmitted and processed by a computer, which is formed by scanning tissue pathological sections through a dedicated microscopic imaging system. Although digital pathological section imaging technology has been popularized and applied in major medical institutions, at present, the diagnostic analysis of WSI still requires doctors to repeatedly observe under magnifying glasses of different scales to obtain the diagnostic results, which depend on the doctors' comprehensive medical literacy and subjective experience judgment, and therefore there is a certain misdiagnosis rate. In recent years, with the rapid development of artificial intelligence technology, the computer-aided diagnosis method based on whole slide digital pathological images has attracted more and more attention.

A major distinguishing feature of the computer-aided diagnosis method based on whole slide images over other medical images is that the color normalization process of the pathology images is required to eliminate the color differences of the pathology images caused by different stain ratios, staining platforms, scanning platforms, and some human factors. The effect of color normalization directly affects the accuracy of the computer-aided diagnosis methods based on pathological images.

At present, the hematoxylin-eosin (HE) stain is the most commonly used stain for making digital pathology images, and scholars at home and abroad have proposed a variety of color normalization methods for HE-stained pathology images. Some scholars directly use color enhancement methods of natural scene images to normalize digital pathology images, such as histogram equalization, histogram normalization, Retinex enhancement, etc. These methods cannot achieve satisfactory normalization results because they do not consider the essential color features of pathology images. Based on the prior knowledge that the color of pathological images is composed of a limited mixture of stains, the color deconvolution algorithm performs linear transformation on pathological images in optical density space, the independent color component are first separated, and then the normalized HE stained images are synthesized. However, the algorithm requires measurement of the deconvolution parameters by experimental means, and the same set of parameters cannot adapt to pathological images from different platforms. The color normalization algorithm based on nuclei detection classifies the nuclei and cytoplasm in pathological images, and the adaptive color deconvolution parameters are obtained by a priori calculation. This method no longer relies on experiment to obtain deconvolution parameters, which greatly improves the adaptability of the algorithm. However, the effect of this method depends on the nuclear detection and segmentation algorithm, and once the nuclear detection algorithm fails, the reasonable normalization effect cannot be obtained, and the calculation amount of the nuclear detection and segmentation algorithm is large, which slows down the whole normalization process. The existing computer-aided diagnosis methods based on pathological images all require that the color normalization algorithm be firstly adopted to obtain normalized pathological images, and then classification results be obtained based on normalized pathological images. The classification accuracy and processing speed are restricted by the performance of the color normalization algorithm.

SUMMARY

In order to solve the technical problem that the accuracy and processing speed of the existing pathological image-based computer-aided diagnosis method are subject to the performance of the color normalization algorithm, the present disclosure proposes a method for automatic pathological image classification based on a staining intensity matrix.

The technical solution employed by the present disclosure is as follows:

a method for automatic classification of pathological images based on a staining intensity matrix, includes the following steps of:

step S1: using a sliding window to segment a whole slide image, and excluding background blank regions while preserving foreground tissue regions to obtain K image blocks with a size of n×n, where n is a pixel width of each image block;

step S2: calculating a stain-to-color correspondence matrix $W \in R^{m \times r}$ of the whole slide image, where m=3 represents three color channels of RGB, and r represents a number of staining channels;

step S3: calculating a staining intensity matrix $H_k \in R^{n \times n \times r}$ for each image block obtained in step S1, where k denotes a $k^{th}$ image block;

step S4: inputting the staining intensity matrix of each image block to a trained classification network, and obtaining a classification result of each image block;

step S5: synthesizing the classification results of respective image blocks to obtain a classification result of the whole slide image; preferably, a random forest algorithm or the like can be used to synthesize the classification results of respective image blocks.

Furthermore, the step S2 includes the following sub-steps:

step S21: estimating an illumination intensity i0 of the whole slide image;

step S22: randomly sampling l image blocks among the image blocks obtained in step S1 in a non-overlapping manner, and calculating a relative optical density matrix $V_j$ for each image block using a Beer-Lambert law:

$$V_j = \ln \frac{i0}{I_j + 1}, j = 1, \ldots l$$

where $I_j \in R^{n \times n \times 3}$ is a representation matrix of a $j^{th}$ image block in a RGB color mode;

step S23: calculating the stain-to-color correspondence matrix $\hat{W}_j$ for each image block using a dictionary learning method based on the relative optical density matrix $V_j$, and using a median matrix of the stain-to-color correspondence matrices for all image blocks as a stain-to-color correspondence matrix W for the whole slide image;

Furthermore, the step S21 specifically includes: sampling a plurality of pixel points which meet the requirement that three channel values of RGB are all larger than 230 on the full-section digital pathological image, and on the three color channels of RGB, taking a $90^{th}$ percentile of these pixels as an illumination intensity value of the channels, respectively, to obtain the illumination intensity i0.

Furthermore, the step S3 specifically includes the following sub-steps:

step S31: calculating a relative optical density matrix $V_k$ for each image block using the Beer-Lambert law, respectively:

$$V_k = \ln \frac{i0}{I_k + 1}, k = 1, \ldots K$$

where $I_k \in R^{n \times n \times 3}$ is a representation matrix of the $k^{th}$ image block in the RGB color mode;

step S32: calculating a staining intensity matrix $H_k$ for each image block using a deconvolution method:

$$H_k = (W^T W)^{-1} W^T V_k.$$

Furthermore, in the step S4, the trained classification network is obtained by training by the following method:

collecting Z whole slide images with diagnostic labels, and processing ach whole slide image through steps S1-S3 to obtain a staining intensity matrix $H_i \in R^{n \times n \times r}$ of Z×K image blocks; constructing a training data set $(H_i, y_i)$, $i=1, 2, \ldots, Z \times K$; $y_i$ is a diagnostic label corresponding to the original whole slide digital pathological image of the image block corresponding to $H_i$, which reflects whether there is a lesion and the type of the lesion in the tissue area corresponding to $H_i$;

constructing the classification network with the staining intensity matrix as an input and the classification result as a prediction target, training the classification network using the obtained staining intensity matrix of Z×K image blocks and the diagnostic label of the whole slide image from the original source of each image block until a loss of the prediction result and the diagnostic label converges to or reaches a set number of iterations, and obtaining the trained classification network.

Furthermore, the structure of the classification network is ResNet50.

The beneficial effects of the present disclosure compared to the prior art are as below:

(1) The present disclosure has universality for respective diseases that can be diagnosed based on histopathological images.

(2) The method for pathological image classification proposed by the present disclosure directly extracts the staining intensity matrix irrelevant to the stain ratio, staining platform, scanning platform and some artifacts in the pathological image as the feature information of classification, preserves all the impurity-free information related to diagnosis, and it is not necessary to restore the normalized HE stained image, and the diagnosis of pathological images can be realized in a shorter time, which is easy to realize.

(3) The present disclosure avoids the phenomenon that the diagnostic effect of the existing computer-aided diagnosis method of pathological images based on the traditional color normalization method varies with the change of the selected standard pathological section. Moreover, it avoids the error introduced by the need to restore the stained HE image, and has a higher diagnostic accuracy and a more stable diagnostic effect, which is more practical.

DESCRIPTION OF EMBODIMENTS

The present disclosure will be further described in detail below with reference to the accompanying drawings and specific examples, which are not described in detail and which are well known to those skilled in the art.

Figure 1:
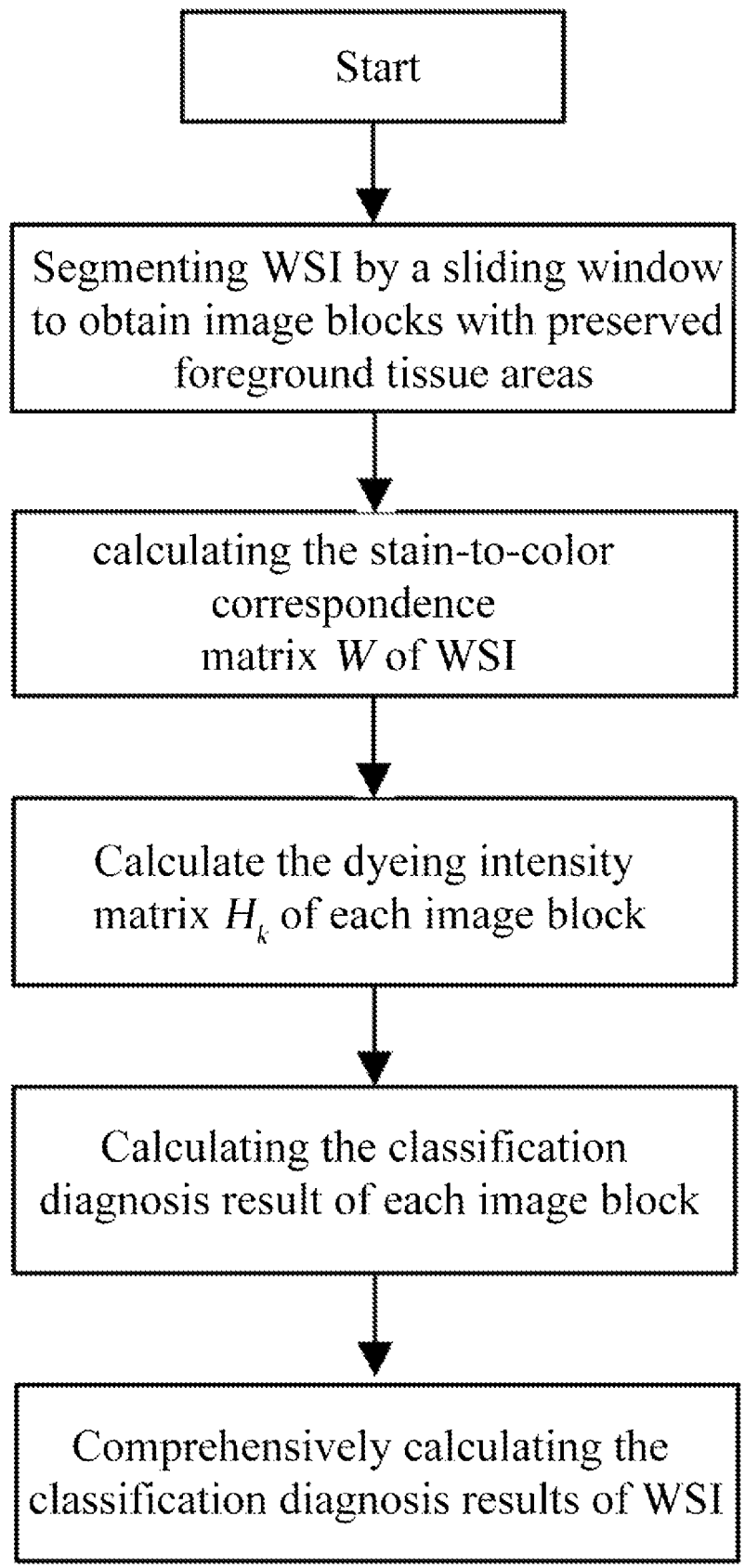
FIG. 1 is a flow diagram of a method for automatic classification of pathological images based on a staining intensity matrix of the present disclosure.

This example takes the diagnosis and classification of lung adenocarcinoma and lung squamous cell carcinoma as an example. The image block classification network uses ResNet50, and the random forest algorithm is used to synthesize the classification diagnosis results of respective image blocks. The training data is 200 whole slide digital pathological images that have been labeled by professional imaging doctors, among which, there are 100 images of lung adenocarcinoma and 100 images of lung squamous cell carcinoma. The diagnosis and classification of lung adenocarcinoma and lung squamous cell carcinoma using the proposed automatic classification method of pathological images based on the staining intensity matrix includes the following steps (as shown in FIG. 1):

Step S1: a whole slide image is divided into image blocks with a size of n×n by a sliding window, and the image blocks of the background blank region are rejected; finally, K (K>30) image blocks are obtained, where n is the pixel width of each image block, and the total number of pixels of each image block is nn=n×n.

Figure 2:
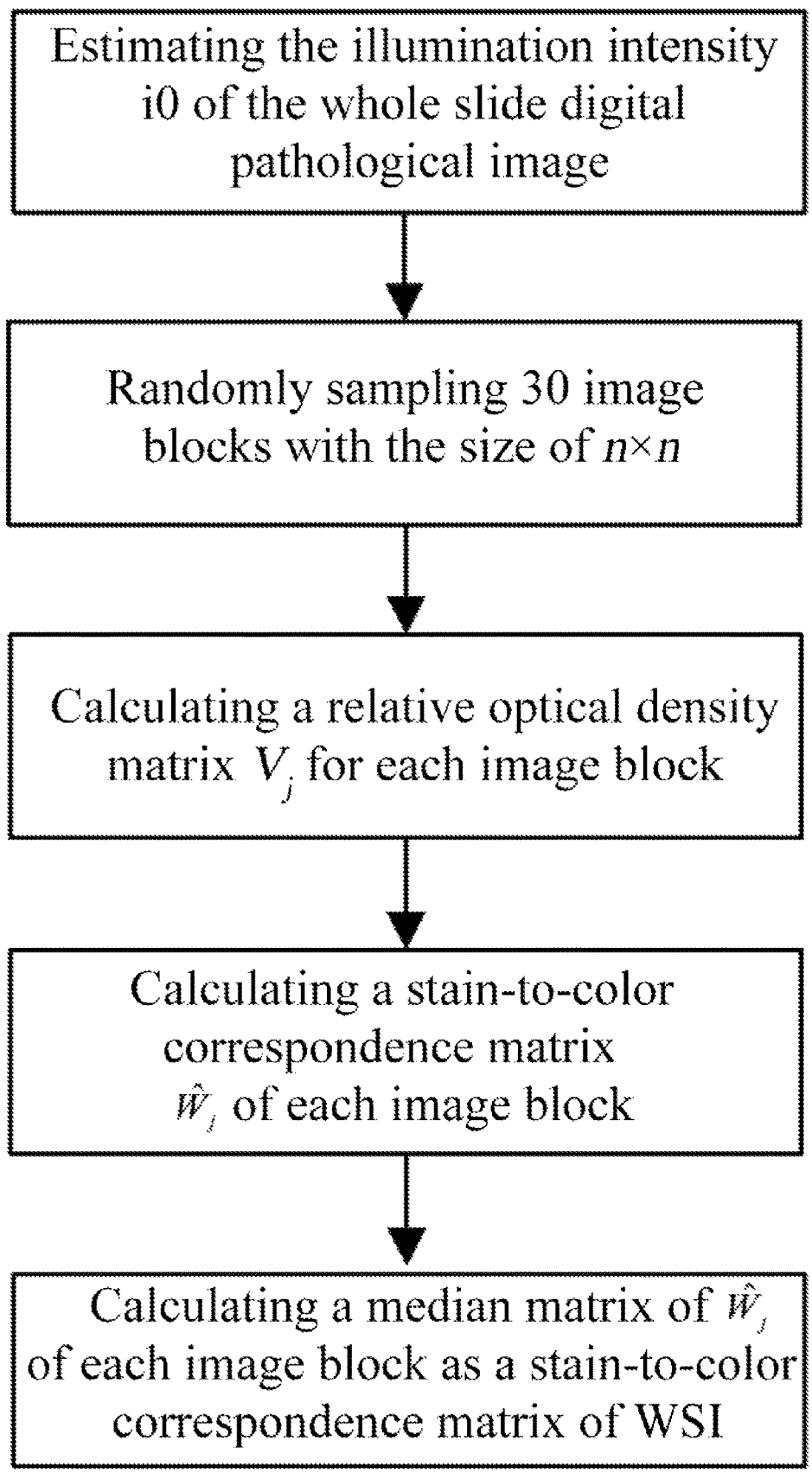
FIG. 2 is a flow chart for calculating a stain-to-color correspondence matrix for a whole slide image in accordance with the present disclosure.

Step S2: the stain-to-color correspondence matrix $W \in R^{m \times r}$ of the whole slide image is calculated, where m=3 represents the three color channels of RGB, and r=2 represents the two staining channels of hematoxylin and eosin; the specific steps are as follows (as shown in FIG. 2):

Step S21: the illumination intensity i0 of the whole slide image is estimated as below:

sufficient points with RGB three-channel values greater than 230 are sampled from the whole slide images, and the $90^{th}$ percentiles of these pixels are respectively taken as the illumination intensity value of the channels.

step S22: random sampling is performed in a non-overlapping manner in the foreground tissue region of the whole slide image, i.e., the image block obtained in step S1, to obtain 30 image blocks with a size of n×n; the relative optical density matrix $V_j$ for each image block is calculated using the Beer-Lambert law:

$$V_j = \ln \frac{i0}{I_j + 1}, j = 1, \ldots l \quad (1)$$

where $I_j \in R^{n \times n \times 3}$ is the representation matrix of the $j^{th}$ image block in the RGB color mode.

Step S23: the stain-to-color correspondence matrix $\hat{W}_j$ for each image block is calculated using a dictionary learning method from the relative optical density matrix $V_j$, j=1, ... 30; the solution process is specifically:

the Vj is organized and written as a matrix $V_j'$ of a size of 3×nn, and then the stain-to-color correspondence matrix $\hat{W}_j$ is obtained by using equation (2):

$$\hat{W}_j = \underset{W_j}{\operatorname{argmin}} \|\alpha\|, \ V_j' = W_j \alpha \qquad (2)$$

where $\alpha \in R^{2 \times nn}$ is the sparse matrix obtained in the dictionary learning decomposition process, and $\|*\|$ denotes the kernel norm of the matrix;

finally, the median matrix of the stain-to-color correspondence matrices of all image blocks is obtained as the stain-to-color correspondence matrix W of the whole slide image.

Figure 3:
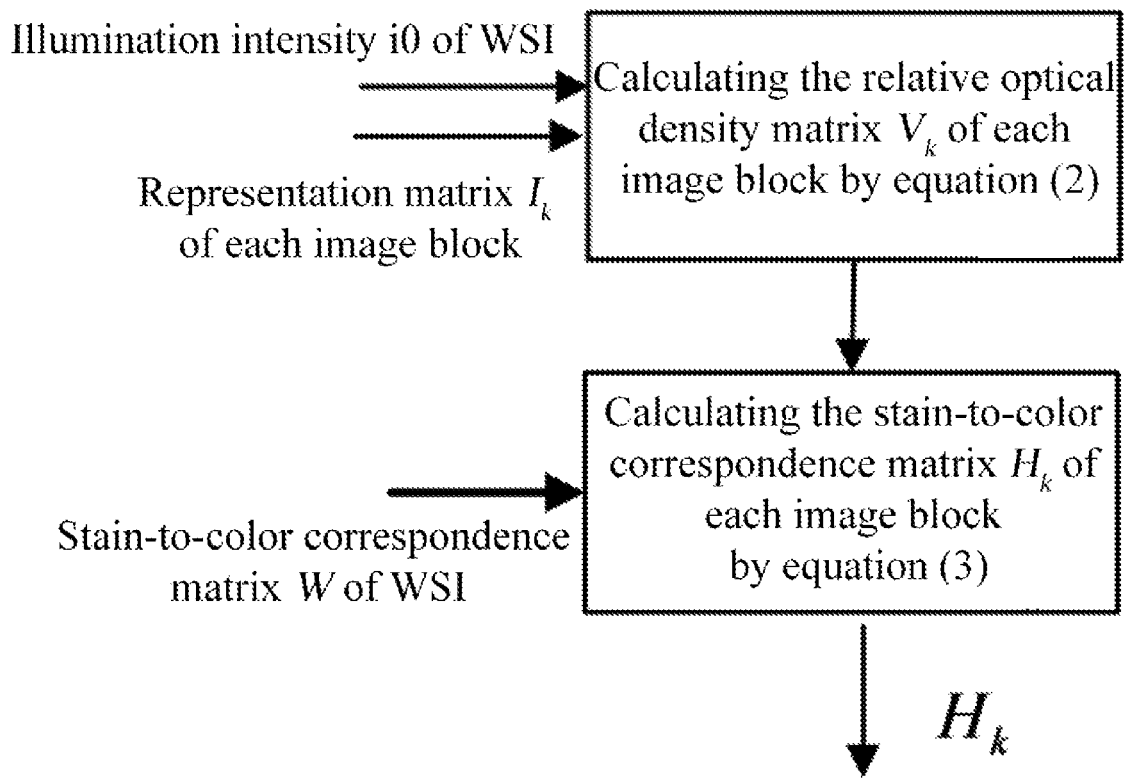
FIG. 3 is a flow chart for calculating a color intensity matrix for an image block in accordance with the present disclosure.

Step S3: the staining intensity matrix $H_k \in R^{n \times n \times r}$ for each image block obtained in the step S1 is calculated, where k denotes the $k^{th}$ image block, which includes the following steps (as shown in FIG. 3):

step S31: the relative optical density matrix $V_k$ for each image block is calculated separately using the Beer-Lambert law:

$$V_k = \ln \frac{i0}{I_k + 1}, k = 1, \ldots K \qquad (3)$$

where K is the total number of image blocks of the foreground tissue region retained after excluding the image blocks of the background blank region; $I_k \in R^{n \times n \times 3}$ is the representation matrix of the $k^{th}$ image block in the RGB color mode;

Step S32: the staining intensity matrix $H_k$ for each image block is calculated using a deconvolution method:

$$H_k = (W^T W)^{-1} W^T V_k \qquad (4)$$

Step S4: each image block is input into the trained ResNet50 classification network, and the classification diagnosis result of each image block is obtained.

Further, in step S4, the preparation process of the raining data set for the ResNet50 classification network is as below: each whole slide image in the training set is sectioned using a sliding window, and steps S1 to S3 are repeated to obtain a staining intensity matrix for each image block as an input to the classification network; the training label is labeled by the doctor corresponding to each image block, and is lung adenocarcinoma, lung squamous carcinoma or normal in this example. When the loss of the network output and diagnostic label converges to or reaches a set number of iterations, a well-trained classification network is obtained.

Step S5: a random forest algorithm is used to synthesize the classification diagnosis results of respective image blocks to obtain the classification result of the whole slide image.

The method for pathological image classification proposed by the present disclosure directly extracts the staining intensity matrix irrelevant to the stain ratio, the staining platform, the scanning platform and some artifacts in the pathological image as the feature information of the classification. All the impurity-free information related to diagnosis is preserved; there is no need to restore the normalized HE stained image, and the diagnosis of pathological images can be realized in a shorter time, which is easy to realize.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The above embodiments are not intended to limit the present disclosure, and the present disclosure is not intended to be limited to the above embodiments. Any modifications or changes, as long as the present disclosure is fulfilled, shall fall within the scope of the present disclosure.

What is claimed is:

1. A computer implemented method for automatic classification of pathological images based on a staining intensity matrix, comprises the following steps of:
   obtaining a whole slide image via a dedicated microscopic imaging system;
   step S1: using a sliding window to segment the whole slide image, and excluding background blank regions while preserving foreground tissue regions to obtain K image blocks with a size of n×n, where n is a pixel width of each image block;
   step S2:
   calculating a stain-to-color correspondence matrix W∈R.sup.m×r of the whole slide image, where m=3 represents three color channels of RGB, and r represents a number of staining channels, which comprises the following sub-steps:
   step S21: estimating an illumination intensity i0 of the whole slide image;
   step S22:
   randomly sampling I image blocks among the image blocks obtained in step S1 in a non-overlapping manner, and calculating a relative optical density matrix $V_j$ for each image block using a Beer-Lambert law:

$$V_j = \ln\frac{i0}{I_j+1}, j = 1, \ldots l \qquad (5)$$

where $I_j \in R^{n \times n \times 3}$ is a representation matrix of a $j^{th}$ image block in a RGB color mode;

step S23: calculating the stain-to-color correspondence matrix $\hat{W}_j$ for each image block using a dictionary learning method based on the relative optical density matrix $V_j$, and using a median matrix of the stain-to-color correspondence matrices for all image blocks as a stain-to-color correspondence matrix W for the whole slide image;

step S3: calculating a staining intensity matrix $H_k \in R^{n \times n \times r}$, based on the stain-to-color correspondence matrix W, for each image block obtained in step S1, where k denotes a $k^{th}$ image block;

step S4: inputting the staining intensity matrix of each image block to a trained classification network, and obtaining a classification result of each image block;

step S5: synthesizing the classification results of respective image blocks to obtain a classification result of the whole slide image.

2. The method for automatic classification of pathological images according to claim 1, wherein the step S21 specifically comprises: sampling a plurality of pixel points which meet the requirement that three channel values of RGB are all larger than 230 on the full-section digital pathological image, and on the three color channels of RGB, taking the $90^{th}$ percentiles of these pixels as an illumination intensity value of the channels, respectively, to obtain the illumination intensity i0.

3. The method for automatic classification of pathological images according to claim 1, wherein the step S3 specifically comprises the following substeps:

step S31: calculating a relative optical density matrix $V_k$ for each image block using the Beer-Lambert law, respectively:

$$V_k = \ln\frac{i0}{I_k+1}, k = 1, \ldots K$$

where $I_k \in R^{n \times n \times 3}$ is a representation matrix of the $k^{th}$ image block in the RGB color mode;

step S32: calculating a staining intensity matrix $H_k$ for each image block using a deconvolution method:

$H_k = (W^T W)^{-1} W^T V_k$.

4. The method for automatic classification of pathological images according to claim 1, wherein in the step S4, the trained classification network is obtained by training by the following method:

collecting Z whole slide images with diagnostic labels, and processing ach whole slide image through steps S1-S3 to obtain a staining intensity matrix as an input and the classification result as a prediction target, training the classification network using the obtained staining intensity matrix of Z×K image blocks and the diagnostic label of the whole slide image from the original source of each image block until a loss of prediction result and the diagnostic label converges to or reaches a set number of iterations, and obtaining the trained classification network.

5. The method for automatic classification of pathological images according to claim 4, wherein the structure of the classification network is ResNet50.

\* \* \* \* \*